Aug. 20, 1957     N. L. KREUDER     2,803,759
ELECTRICAL IMPULSE GENERATOR

Filed Nov. 22, 1954

INVENTOR.
NORMAN L. KREUDER

BY

Christie, Parker & Hale

ATTORNEYS

United States Patent Office 2,803,759
Patented Aug. 20, 1957

2,803,759

ELECTRICAL IMPULSE GENERATOR

Norman L. Kreuder, Tujunga, Calif., assignor, by mesne assignments, to Burroughs Corporation, Detroit, Mich., a corporation of Michigan Application November 22, 1954, Serial No. 470,247

16 Claims. (Cl. 307—106)

This invention relates to generators for providing electrical impulses, and more particularly, to an improved impulse generator including a magnetizable core.

In many types of electrical systems, as for example, data processing equipment, it is necessary to generate an electrical impulse in response to an electrical circuit being completed by a circuit connection device. In ordinary circuit connection devices, such as switches or relays, the contacts have a tendency to come together and chatter or bounce for a short interval before finally coming to rest. When known types of impulse generators are used to generate an impulse in response to an electrical circuit being completed by a circuit connection device, an impulse is produced the first time the contacts come together and successive contacts within the transient period sometimes cause the impulse generator to generate additional extraneous impulses which disturb the output equipment to which the impulse generator is connected.

In accordance with my invention, I provide an improved impulse generator which generates a single electrical impulse in response to a circuit connection and does not respond to subsequent circuit connections.

In one embodiment of the invention, the impulse generator includes a magnetizable core having a magnetization characteristic of rectangular shape, at least one winding for changing the core from one condition of magnetization to another condition of magnetization, and means coupling a circuit connection device to the winding.

In a preferred embodiment, the invention includes a first winding on a magnetizable core for causing the core to assume a first condition of magnetization, a second winding on the core for causing the core to assume a second condition of magnetization, an output winding on the core from which may be derived an electrical impulse when the core is changed from one condition of magnetization to another, a first energizing circuit connected to the first winding, a second energizing circuit connected to the second winding, and a circuit connection device which is adapted to be connected to the first energizing circuit and the second energizing circuit alternately.

A better understanding of my invention may be had upon a reading of the following specification and an inspection of the drawings, in which.

Figure 1:
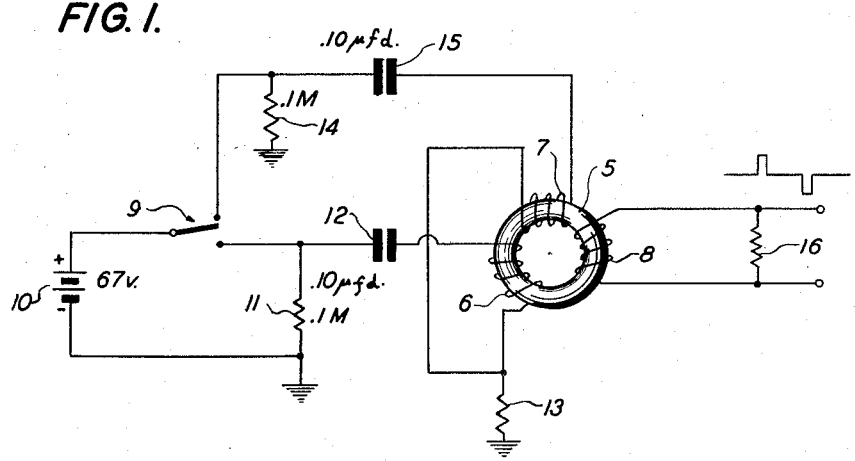
Fig. 1 is a schematic circuit diagram of one embodiment of my invention.
Figure 2:
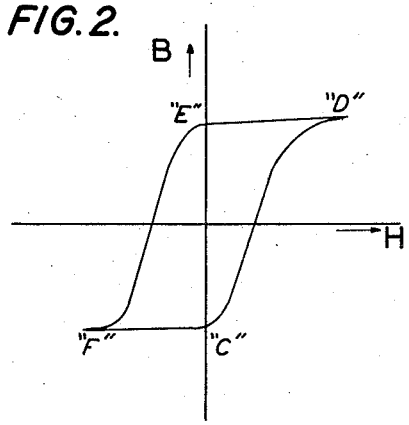
Fig. 2 is a graphical illustration of the magnetization characteristic of a magnetizable core.

The impulse generator of Fig. 1 includes a magnetizable core 5 upon which there are three windings; a first magneto-motive force producing winding 6, a second magneto-motive force producing winding 7, and an output winding 8. The core 5 may be made of any magnetizable material, but preferably should be made of a material having a rectangular magnetization characteristic as shown in Fig. 2. One such material which has worked satisfactorily is ferrite.

Referring to Fig. 2, the magneto-motive force H applied to the material is represented by the abscissa, while the resulting flux density B, i. e. magnetization of the material, is represented by the ordinate.

In Fig. 1, a circuit connection device is exemplified by a single pole double-throw switch. Across the moving contact of the switch 9 may be impressed a voltage from a source of voltage, such as the battery 10. When the switch 9 is placed in one position, the voltage from the battery 10 is impressed across a bleeder resistor 11 and charges a capacitor 12. The charging of the capacitor 12 causes an electrical impulse to be impressed across the winding 6 and the current limiting resistor 13. The resultant current flowing through the winding 6 generates a magneto-motive force which tends to magnetize the core 5 in one direction.

Assuming the magneto-motive force to be positive, as graphically illustrated in Fig. 2, the magnetic state of the core 5 will be changed along the curve from point C to point D to point E. Any successive contacts of the switch 9 merely vary the condition of magnetization of the core along the curve between D and E. Thus, the first contact causes considerable flux change, but subsequent contacts cause practically no flux change. In response to the change of flux, an electrical impulse is generated across the output winding 8 when the condition of magnetization changes from C to D, but subsequent impulses applied to the winding 6 produce no substantial flux change and hence no substantial output impulses.

In like manner, when the movable contact of the switch 9 is switched to the other pole whereby the voltage from the source 10 is impressed across the bleeder resistor 14, the capacitor 15 is charged and an electrical impulse is applied across the winding 7 and a current limiting impedance, such as a resistor 13. By arranging the connections so that the winding 7 produces a magneto-motive force in a direction opposite to that produced by the winding 6, the condition of magnetization of the core may be changed, as shown in Fig. 2, from E to F to C.

Successive impulses produced by the switch 9 cause the condition of magnetization to vary between F and C with no substantial change in flux density. As a result, the change in magnetization from E to F causes an output impulse to appear across the output winding 8, but subsequent impulses applied to the winding 7 produce no substantial impulses across the output winding 8.

When the voltage is applied across the resistor 14, the capacitor 12 discharges through the resistor 11, thereby preparing the energizing circuit associated with the winding 6 for a subsequent impulse. In like manner, when the voltage is applied across the resistor 11, the capacitor 15 discharges through the resistor 14, thereby preparing the energizing circuit associated with the winding 7 for another impulse.

The output winding 8 may be terminated in a suitable impedance such as a resistor 16 so as to preclude the output circuit from resonating due to distributed capacity acting in conjunction with the inductance of the winding 8. It will be appreciated that the output impulse train appearing across the output winding 8 consists of alternate positive and negative impulses.

Figure 3:
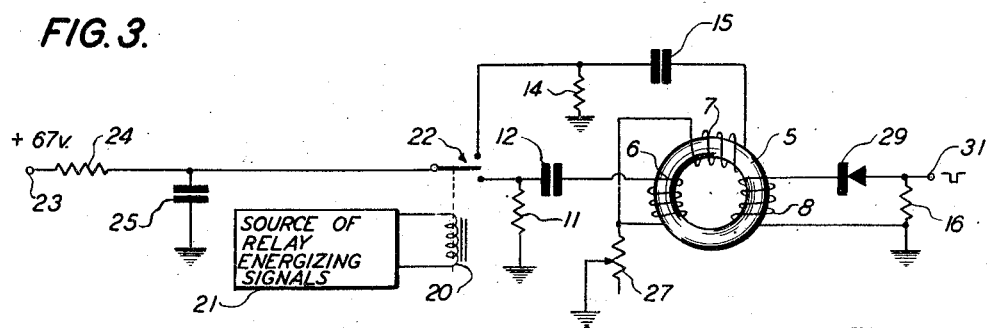
Fig. 3 is a schematic circuit diagram of an alternative embodiment of my invention.

In Fig. 3, like reference characters have been used to designate parts which are similar to those shown in Fig. 1. Fig. 3 shows an alternative embodiment of the invention in which a relay coil 20 of a relay 22 is energized from a suitable source of relay energizing signals 21. A voltage from a battery or the like may be applied to a movable contact of the relay 22 via a terminal 23 and a current limiting resistor 24. Since the capacitors 12 and 15 are relatively large, in some applications it is desirable to include the resistor 24 and a by-pass capacitor 25 to reduce the instantaneous load placed on the voltage source.

In operation, the circuit of Fig. 3 is similar to that of Fig. 1. Thus, when the relay coil is energized, a voltage is impressed across the bleeder resistor 11 which charges the capacitor 12 and the current through the winding 6 causes the core 5 to change its condition of magnetization from C to D to E of Fig. 2. Likewise, when the relay coil is de-energized, a voltage is applied across the resistor 14, the capacitor 15 is charged, and the current through the winding 7 causes the core 5 to change its condition of magnetization from E to F to C of Fig. 2.

It will be noted that in Fig. 3 the windings 6 and 7 are connected to one end of a potentiometer 27. The potentiometer 27 limits the rate at which current can pass through the windings 6 and 7. Consequently, the rate at which the condition of magnetization can change from C to D in the case of winding 6 or from E to F in the case of winding 7, may be varied. By this means the time duration of the impulse induced in the winding 8 may be varied, although it will be appreciated that some loss in impulse amplitude may result from lengthening the impulse duration.

In Fig. 3 a unilateral conduction means, such as a diode 29, is connected serially with the output winding 8. By means of the diode 29, the output impulses of a selected polarity only are passed to the output terminal 31. As shown, the impulses appearing at the output terminal 31 are negative going. However, by reversing the connection of the diode 29, positive going impulses may be caused to appear at the output terminal 31.

Although specific circuit values and voltages have been indicated, the impulse generator of my invention may be adapted to practically any size voltage input by varying the sizes of the resistors and capacitors. In addition, it should be noted that the amplitude of the output impulse appearing across the winding 8 may be varied by a changing of the turns ratio between the windings 6 and 7 and the output winding 8. In one embodiment, a 1:1:1 ratio was used which resulted in the output impulse being of the approximate amplitude of the value of the source of voltage applied across the resistors 11 and 14, i. e. 67 volts.

In Figs. 1 and 3 the value of each of the resistors is given in ohms, where M=megohm, the value of each of the capacitors is given in microfarads ($\mu$f.), and the value of each of the voltages is given in volts (v.).

Therefore, in accordance with my invention, I have provided an improved impulse generator which is adapted to provide a single output impulse in response to a group of irregular impulses such as is encountered in mechanical switching circuits in which there is a tendency for the contacts to come together in an irregular and interrupted fashion.

I claim:

1. An electrical impulse generator, including a magnetizable core having a substantially rectangular magnetization characteristic, a first winding for causing said magnetic core to assume a first condition of magnetization, a second winding for causing said core to assume a second condition of magnetization, a third winding across which an electrical impulse appears whenever the magnetization of said core is changed from one of said conditions to another of said conditions, a first energizing circuit connected across the first winding comprising a first resistor and a first capacitor, a second energizing circuit connected across said second winding comprising a second resistor and a second capacitor, a source of voltage, and means for alternately impressing the voltage from said source across said first resistor and said second resistor whereby alternate positive going and negative going impulses appear across said third winding.

2. An electrical impulse generator in accordance with claim 1 in which a common impedance is connected serially with both said first and said second windings.

3. An electrical impulse generator in accordance with claim 1 in which a unilateral conduction device and a load impedance are connected serially across said third winding whereby impulses of one given polarity only appear across said load impedance.

4. An electrical impulse generator, including a magnetizable core constructed of a material having a magnetization characteristic which is substantially rectangular when the resultant flux density in the material is plotted against the magneto-motive force acting upon the material, said magnetization characteristic displaying one condition of magnetization in which the flux density remains relatively constant with variation in magneto-motive force, and another condition of magnetization of opposite polarity to said first condition of magnetization in which the flux density remains relatively constant with variation in magneto-motive force; a first winding on said core for producing a magneto-motive force which causes the core to be placed in said first given condition of magnetization; a second winding on said core for producing a magneto-motive force which causes the core to be placed in said other condition of magnetization; a third winding on said core across which appears an electrical signal when said core is changed from one of said conditions of magnetization to the other of said conditions of magnetization; a circuit connection device having a movable contact and two fixed contacts; a first resistor connected to one of said fixed contacts; a second resistor connected to the other of said fixed contacts; a capacitor connected between one of said fixed contacts and said first winding; a second capacitor connected between the other of said fixed contacts and said second winding; and a source of voltage connected to said movable contact.

5. Apparatus in accordance with claim 4 in which a diode is connected serially with said third winding.

6. Apparatus in accordance with claim 4 in which a common impedance is connected serially with both said first winding and said second winding.

7. An electrical impulse generator, including a magnetizable core having a substantially rectangular magnetization characteristic, a first winding for causing said core to assume a first condition of magnetization, a second winding for causing said core to assume a second condition of magnetization, a third winding on said core across which an electrical impulse appears whenever said core is changed from one of said conditions to the other of said conditions, a circuit connection device having a movable contact and two fixed contacts, a source of voltage connected serially with said movable contact, means coupling one of said fixed contacts to said first winding, and means coupling the other of said fixed contacts to said second winding whereby said first and said second windings may be alternately energized to cause said core to assume either of said conditions of magnetization.

8. An electrical impulse generator in accordance with claim 7 in which a common impedance is connected serially with both said first and said second windings.

9. An electrical impulse generator in accordance with claim 7 in which a unilateral conduction device and a load impedance are connected serially across said third winding whereby impulses of one given polarity only appear across said load impedance.

10. An electrical impulse generator, including a magnetizable core having a substantially rectangular magnetization characteristic, a first winding of causing said magnetic core to assume a first given condition of magnetization, a second winding for causing said core to assume a second condition of magnetization, a third winding across which an electrical impulse appears whenever the magnetization of said core is changed from one of the said conditions to another of the said conditions, a source of electrical impulses, means for selectively coupling said source to said first winding whereby said core is placed in one condition of magnetization in response to an electrical impulse from said source, and means for selectively coupling said electrical impulse source to said second winding whereby said core may be placed in another condition of magnetization in response to an electrical impulse from said source.

11. An electrical impulse generator in accordance with claim 10 in which a common impedance is connected serially with both said first and said second windings.

12. An electrical impulse generator in accordance with claim 10 in which a unilateral conduction device and a load impedance are connected serially across said third winding whereby impulses of one given polarity only appear across said load impedance.

13. An electrical impulse generator, including a magnetizable core constructed of a material having a magnetization characteristic which is substantially rectangular when the resultant flux density in the material is plotted against the magneto-motive force acting upon the material, said magnetization characteristic displaying one condition of magnetization in which the flux density remains relatively constant with variation in magneto-motive force, and another condition of magnetization in which the flux density remains relatively constant with variation in magneto-motive force; a first winding on said core for producing a magneto-motive force which causes the core to be placed in said first given condition of magnetization; a second winding on said core for producing a magneto-motive force which causes the core to be placed in said other condition of magnetization; a third winding on said core across which appears an electrical signal when said core is changed from one of said conditions of magnetization to the other of said conditions of magnetization; a source of electrical impulses; means selectively coupling said source to said first winding whereby said core may be placed in said first condition of magnetization; and means selectively connecting said source of electrical impulses to said second winding whereby said core may be placed in said second condition of magnetization.

14. An electrical impulse generator, including a magnetizable core constructed of a material having a magnetization characteristic which is substantially rectangular when the resultant flux density in the material is plotted against the magneto-motive force acting upon the material, said magnetization characteristic displaying one condition of magnetization in which the flux density remains relatively constant with variation in magneto-motive force, and another condition of magnetization of opposite polarity to said first condition of magnetization in which the flux density remains relatively constant with variation in magneto-motive force; a first winding on said core for producing a magneto-motive force which causes the core to be placed in said first given condition of magnetization; a second winding on said core for producing a magneto force which causes the core to be placed in said other condition of magnetization; a third winding on said core across which appears an electrical signal when said core is changed from one of said conditions of magnetization to the other of said conditions of magnetization; a circuit connection device having a movable contact and two fixed contacts; a source of voltage connected to said movable contact; means coupling one of said fixed contacts to said first winding; and means coupling the other of said fixed contacts to said second winding whereby an electrical impulse appears across said third winding whenever said movable contact makes connection with one of said fixed contacts for the first time after having been in connection with the other of said fixed contacts.

15. An electrical impulse generator in accordance with claim 14 in which a common impedance is connected serially with both said first and said second windings.

16. An electrical impulse generator in accordance with claim 14 in which a unilateral connection device and a load impedance are connected serially across a third winding whereby impulses of one given polarity only appear across said load impedance.

References Cited in the file of this patent

UNITED STATES PATENTS 2,419,227    Peterson _____ Apr. 22, 1947